H. MANN.
Cultivator.
No. 17,797
Patented July 14. 1857.
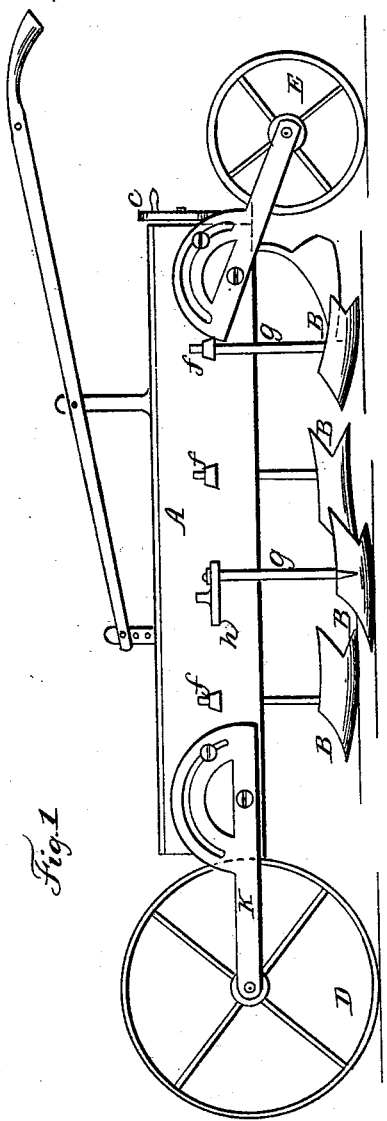
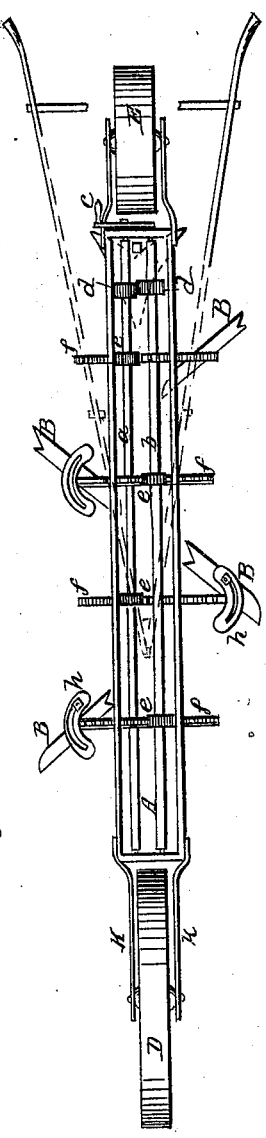

UNITED STATES PATENT OFFICE.

HOWARD MANN, OF SAN FRANCISCO, CALIFORNIA.

IMPROVEMENT IN CULTIVATORS.

Specification forming part of Letters Patent No. 17,797, dated July 14, 1857.

*To all whom it may concern:*

Be it known that I, HOWARD MANN, of San Francisco city and county, and State of California, have invented certain new and useful Improvements in Weeding Implements; and I do hereby declare that the following is a full, clear, and exact description of the same, reference being had to the accompanying drawings, making a part of this specification.

Figure 1 exhibits an elevation, and Fig. 2 a top view with the lid of the box-beam removed.

The beam A is made hollow, and receives within it two shafts, $a$ and $b$, extending lengthwise of the box-beam. They are fitted in suitable bearings at the end of the beam. One of them—viz., $a$—projects sufficiently beyond the beam to receive a turn-wheel or crank, $c$, by which the shaft may be turned.

$d\ d$ are pinions secured on the shafts, meshing into each other for the purpose of rotating the shaft $b$.

$e\ e\ e\ e$ are pinions, also secured on the shafts. They mesh into and operate the racks $f\ f\ f\ f$, placed transversely to the shafts $a'\ b$, said pinions causing by their rotation the advance or retreat of the shares or plows B B B B to or from each other, as may be desired, in the clearing of the weeds from the row of plants. The plows or cutters or shares are made of cast-iron, and are provided with shanks or uprights $g\ g$, firmly bolted or riveted thereto. $h\ h$ are plates of metal secured on the ends of the rack-bars $f$ in said plates, and segmental slots, through which the ends of the shanks $g$ are passed. These shanks have a screw-nut. By the tightening of it the plow is retained at any desired angle to the box-beam A. As shown in the drawings, the plows are at their greatest throw of the land, and by moving the nut toward the left hand the angle is rendered more acute and throw of land lessened. Immediately at the rear of the beam A is secured a double-winged cutter.

D is a light wheel, secured to the front of the box-beam A by swiveling braces or arms $k\ k$. The adjustment of this wheel, as well as the rear one, E, is effected by a slot and semicircular plate attached to said braces. The relative height of beam to the earth and depth of the plow's work in the soil is obtained by means of the aforesaid braces and set-screws passing through the slots thereof.

A pair of handles completes the machine, and with the view of accommodating different heights thereof the attachment of the front ends of the handles is to a post provided with several holes for the bolt to pass through.

In using the implement it may be pushed by the handles or by a horse attached by suitable gear drawn along the rows of plants to be weeded. The arrangement of the plows is such that the weeds and soil by the first two cutters or plows are thrown inward; but as soon as thus placed the rear pair of plows, being set opposite in direction to the first, have the effect of throwing the soil outward, or in direction contrary to the first set, the double plow at the rear completing the operation.

One of the peculiarities in my improvement enables me, by the rotation of the turn-wheel on the end of shaft $a$, to contract or expand the plows or cutters to suit the width of the rows (when inequalities occur) without stopping the movement of the implement.

The second improvement—viz., the means of segmental plate on the rack-bar—allows of an adjustment of the plows to throwing more or less land in a simple and efficient manner.

The implement as constructed and arranged gives the greatest facility in the cultivation of plants in rows, and enables the operator to dispense with the ordinary hand-hoe heretofore employed for the purpose of weeding, by it enabling one man to do the work of many.

Having described my improved weeder, what I claim as my invention, and desire to secure by Letters Patent, is—

The arrangement of shanks $g\ g$ with rack-bars $f\ f$ and segmental plates $h\ h$, in the manner and for the purposes herein set forth.

In testimony whereof I have signed my name before two subscribing witnesses.

H. MANN.

Witnesses:
JOHN F. CLARKE,
JOHNS HOLLINGSHEAD.